(12) United States Patent
Ashby et al.

(10) Patent No.: US 8,656,435 B2
(45) Date of Patent: Feb. 18, 2014

(54) CONTROLLED METADATA REVELATION

(75) Inventors: Stuart Ashby, Thatcham (GB); Colin John Davies, Fordingbridge (GB); Simon John Parnall, Kingswood (GB); James Geoffrey Walker, Winchester (GB); David John White, Weymouth (GB)

(73) Assignee: Cisco Technology Inc., San Jose, CA (US)

( * ) Notice: Subject to any disclaimer, the term of this patent is extended or adjusted under 35 U.S.C. 154(b) by 741 days.

(21) Appl. No.: 12/309,889

(22) PCT Filed: Aug. 7, 2007

(86) PCT No.: PCT/GB2007/002997
§ 371 (c)(1),
(2), (4) Date: Mar. 23, 2009

(87) PCT Pub. No.: WO2008/020171
PCT Pub. Date: Feb. 21, 2008

(65) Prior Publication Data
US 2009/0208180 A1    Aug. 20, 2009

Related U.S. Application Data

(60) Provisional application No. 60/837,569, filed on Aug. 14, 2006.

(51) Int. Cl.
*G06F 13/00* (2006.01)

(52) U.S. Cl.
USPC .......................................... 725/58; 725/135

(58) Field of Classification Search
USPC .................................. 395/95; 386/95; 725/58
See application file for complete search history.

(56) References Cited

U.S. PATENT DOCUMENTS

| | | | |
|---|---|---|---|
| 2002/0138831 A1 | 9/2002 | Wachtfogel et al. | |
| 2003/0163832 A1* | 8/2003 | Tsuria et al. | 725/135 |
| 2003/0177503 A1 | 9/2003 | Sull et al. | |
| 2003/0229679 A1 | 12/2003 | Yoo et al. | |
| 2004/0037449 A1* | 2/2004 | Davis et al. | 382/100 |

(Continued)

FOREIGN PATENT DOCUMENTS

| | | |
|---|---|---|
| EP | 1 193 899 A1 | 4/2002 |
| WO | WO 00/01149 | 1/2000 |
| WO | WO 01/35669 A1 | 5/2001 |

OTHER PUBLICATIONS

Nov. 23, 2009 Office Communication in connection with EP 07 789 133.1. (4 pages).

(Continued)

*Primary Examiner* — Brandon Hoffman
*Assistant Examiner* — Anthony Brown
(74) *Attorney, Agent, or Firm* — Husch Blackwell LLP

(57) ABSTRACT

A method of controlling revelation of one or more metadata items is disclosed. Each of the one or more metadata items is associated with one or more parts of an audio-visual data stream (101). The method comprises: for a given one or more parts (103,105) of the audio-visual data stream (101), revealing one or more metadata items (113,115,117) associated with the given one or more parts (103,105) of the audio-visual data stream (101) only after the given one or more parts (103,105) of the audio-visual data stream (101) have been accessed.

15 Claims, 8 Drawing Sheets

(56) References Cited

U.S. PATENT DOCUMENTS

| | | | |
|---|---|---|---|
| 2004/0128701 A1 | | 7/2004 | Kaneko et al. |
| 2004/0199658 A1 | | 10/2004 | Darshan et al. |
| 2004/0250291 A1 | * | 12/2004 | Rao et al. .................. 725/131 |
| 2005/0005308 A1 | | 1/2005 | Logan et al. |
| 2005/0203927 A1 | | 9/2005 | Sull et al. |
| 2006/0064716 A1 | | 3/2006 | Sull et al. |
| 2007/0157249 A1 | * | 7/2007 | Cordray et al. ............. 725/58 |

OTHER PUBLICATIONS

"Broadcast and On-line Services: Search, select, and rightful use of content on personal storage systems ("TV-Anytime Phase 1"); Part 1: Phase 1 Benchmark Features" (ETSI TS 102 822-1 V1.1.1) (European Telecommunications Standards Institute, Oct. 2003).

"Broadcast and On-line Services: Search, select, and rightful use of content on personal storage systems ("TV-Anytime Phase 1"); Part 2: System description" (ETSI TS 102 822-2 V1.2.1) (European Telecommunications Standards Institute, Sep. 2004).

"Broadcast and On-line Services: Search, select, and rightful use of content on personal storage systems ("TV-Anytime"); Part 3: Metadata; Sub-part 1: Phase 1—Metadata schemas" (ETSI TS 102 822-3-1 V1.3.1) (European Telecommunications Standards Institute, Jan. 2006).

"Broadcast and On-line Services: Search, select, and rightful use of content on personal storage systems ("TV-Anytime Phase 1"); Part 3: Metadata; Sub-part 2: System aspects in a uni-directional environment" (ETSI TS 102 822-3-2 V1.1.1) (European Telecommunications Standards Institute, Oct. 2003).

"Broadcast and On-line Services: Search, select, and rightful use of content on personal storage systems ("TV-Anytime"); Part 3: Metadata; Sub-part 3: Phase 2—Extended Metadata schema" (ETSI TS 102 822-3-3 V1.1.1) (European Telecommunications Standards Institute, Jan. 2006).

"Broadcast and On-line Services: Search, select, and rightful use of content on personal storage systems ("TV-Anytime"); Part 3: Metadata; Sub-part 4: Phase 2—Interstitial metadata" (ETSI TS 102 822-3-4 V1.1.1) (European Telecommunications Standards institute, Jan. 2006).

"Broadcast and On-line Services: Search, select, and rightful use of content on personal storage systems ("TV-Anytime Phase 1"); Part 4: Content referencing" (ETSI TS 102 822-4 V1.1.1) (European Telecommunications Standards Institute, Oct. 2003).

"Digital Video Broadcasting (DVB); Carriage and signaling of TV-Anytime information in DVB transport streams" (ETSI TS 102 323 V1.2.1) (European Telecommunications Standards Institute, Nov. 2005).

"Digital Video Broadcasting (DVB); Specification for the carriage of synchronized auxiliary data in DVB transport streams" (ETSI TS 102 823 V1.1.1) (European Telecommunications Standards Institute, Nov. 2005).

"Information technology—Generic coding of moving pictures and associated audio information: Video" (ISO/IEC 13818-2) (ISO/IEC, Dec. 15, 2000).

Aug. 6, 2012 Office Communication in connection with prosecution of EP 07 789 133.1.

* cited by examiner

CONTROLLED METADATA REVELATION

RELATED APPLICATION INFORMATION

The present application is a 35 USC §371 application of PCT/GB2007/002997, filed on 7 Aug. 2007 and entitled "Controlled Metadata Revelation", which was published on 21 Feb. 2008 in the English language with International Publication Number WO 2008/020171 A2, and which relies for priority on U.S. Provisional Patent Application Ser. No. 60/837,569, filed on 14 Aug. 2006.

FIELD OF THE INVENTION

The present invention relates to a method of controlling revelation of one or more metadata items each associated with one or more parts of an audio-visual data stream.

BACKGROUND TO THE INVENTION

Metadata is generally defined as "data about data". In the context of audio visual (AV) content, the term metadata refers to descriptive data about that content, such as duration, programme title and synopsis. Once AV content has been created and information about the programme has been captured, the content is then available for publication by a content publisher. This could be, for example, as part of a broadcast service or as a publication on the Internet. The metadata editing process takes raw information from the content creation and publishing processes and edits this into a form that is suitable for representing the content to the end consumer.

Segmentation refers to the ability to define, access and manipulate temporal locations or intervals (segments) within a piece of AV content. By associating metadata with segments, it is possible to restructure and re-purpose an input AV stream to generate alternative consumption and navigation modes. Such modes could include, for example, a summary of the content with highlights, or a set of bookmarks that point to "topic headings" within the stream. Such segmentation metadata can be provided by service providers or broadcasters as a value-added feature and/or generated by viewers themselves.

SUMMARY OF THE INVENTION

For some content, the addition of segmentation metadata could spoil a viewer's enjoyment of the content itself. Consider, for example, two viewers who have each recorded a football match on a digital video recorder (DVR). The first viewer, Andrew, returns home and having attended the match himself, does not want to view the entire match in order to view the last minute save that the goalkeeper of his favourite team made to ensure a 2-1 victory for his team. However, the recording of the match is accompanied by segmentation metadata allowing Andrew to access a menu of navigation points (points of interest within the match (e.g. goals, fouls, yellow cards, red cards, saves etc.) from where he can select the point in the match that he is interested in—in this instance the last minute save—and jump directly to that segment of the recording.

The second viewer, Bob, was not at the match and does not know the outcome of the match because he had to attend a luncheon in honour of his mother-in-law's $72^{nd}$ birthday! Bob decides to watch the match in its entirety from the start but at half time, when the score is 1-1, his son Chris comes in to watch with him. However, Chris has not seen the first half but neither does he want to watch the entire first half from start to finish. Bob could access the menu of navigation points in order to jump directly to the various highlights of the first half so that Chris can view them but this would cause the rest of the match to be spoiled for both Bob and Chris as they would see details of all the other segments that they could jump to, including details of the segments showing the remaining goal.

There is provided in accordance with an embodiment of the present invention a method of controlling revelation of one or more metadata items each associated with one or more parts of an audio-visual data stream, the method including: for a given one or more parts of said audio-visual data stream, revealing one or more metadata items associated with the given one or more parts of the audio-visual data stream only after the given one or more parts of the audio-visual data stream has been accessed.

Preferably, the revealing includes also revealing one or more additional metadata items.

Preferably, the one or more additional metadata items are associated with the audio-visual data stream but are not associated with the given one or more parts of the audio-visual data stream.

Preferably, a metadata item includes a group metadata item associated with a plurality of parts of the audio-visual data stream, and the method includes: revealing the group metadata item only after all parts of a reveal list of parts of the audio-visual data stream have been accessed.

Preferably, a metadata item includes a group metadata item associated with a plurality of parts of said audio-visual data stream, and the method includes: revealing the group metadata item after any part of a reveal list of parts of the audio-visual data stream has been accessed.

Preferably, one or more parts on the reveal list are not comprised within the plurality of parts.

Preferably, metadata items are associated with control metadata items usable to determine when the metadata can be revealed.

Preferably, the group metadata item is associated with a group control metadata item usable to determine when parts on the reveal list of parts can be revealed, and the group control metadata item includes the reveal list.

Preferably, a plurality of metadata items are each associated with a part of the audio-visual data stream, and each of the plurality of metadata items is associated with a control metadata item, and each control metadata item includes information related to a temporal location in the audio-visual data stream, and once the audio-visual data stream has been accessed beyond a reveal temporal location, each of the metadata items associated with a temporal location earlier than the reveal temporal location are revealed.

Preferably, the control metadata items include information related to a temporal location in the audio-visual data stream, and the associated part is deemed to have been accessed if the associated part is accessed at a later temporal location.

Preferably, a part of the audio-visual data stream is deemed to have been accessed when a predetermined portion of the part has been viewed.

Preferably, a part of the audio-visual data stream is deemed to have been accessed when all of the part has been viewed.

Preferably, metadata items include data describing associated one or more parts.

Preferably, metadata items include data describing the audio-visual data stream.

Preferably, metadata items include a reference to other data.

Preferably, the one or more parts of the audio-visual data stream include one or more temporal locations within the audio-visual data stream.

Preferably, the one or more parts of the audio-visual data stream include one or more temporal segments of the audio-visual data stream.

Preferably, the audio-visual data stream is delivered to a viewer with the one or more metadata items.

Preferably, the audio-visual data stream is delivered to a viewer separately to the one or more metadata items.

Preferably, the audio-visual data stream is delivered over a communication network.

Preferably, a first metadata item and a second metadata item are each associated with one part of the audio-visual data stream, and the first metadata item and the second metadata item are associated with differing reveal characteristics.

BRIEF DESCRIPTION OF THE DRAWINGS

Embodiments of the present invention will now be described, by way of example only, with reference to the accompanying drawings, wherein like reference numbers refer to like parts, and in which.

DETAILED DESCRIPTION OF EMBODIMENTS

Figure 1:
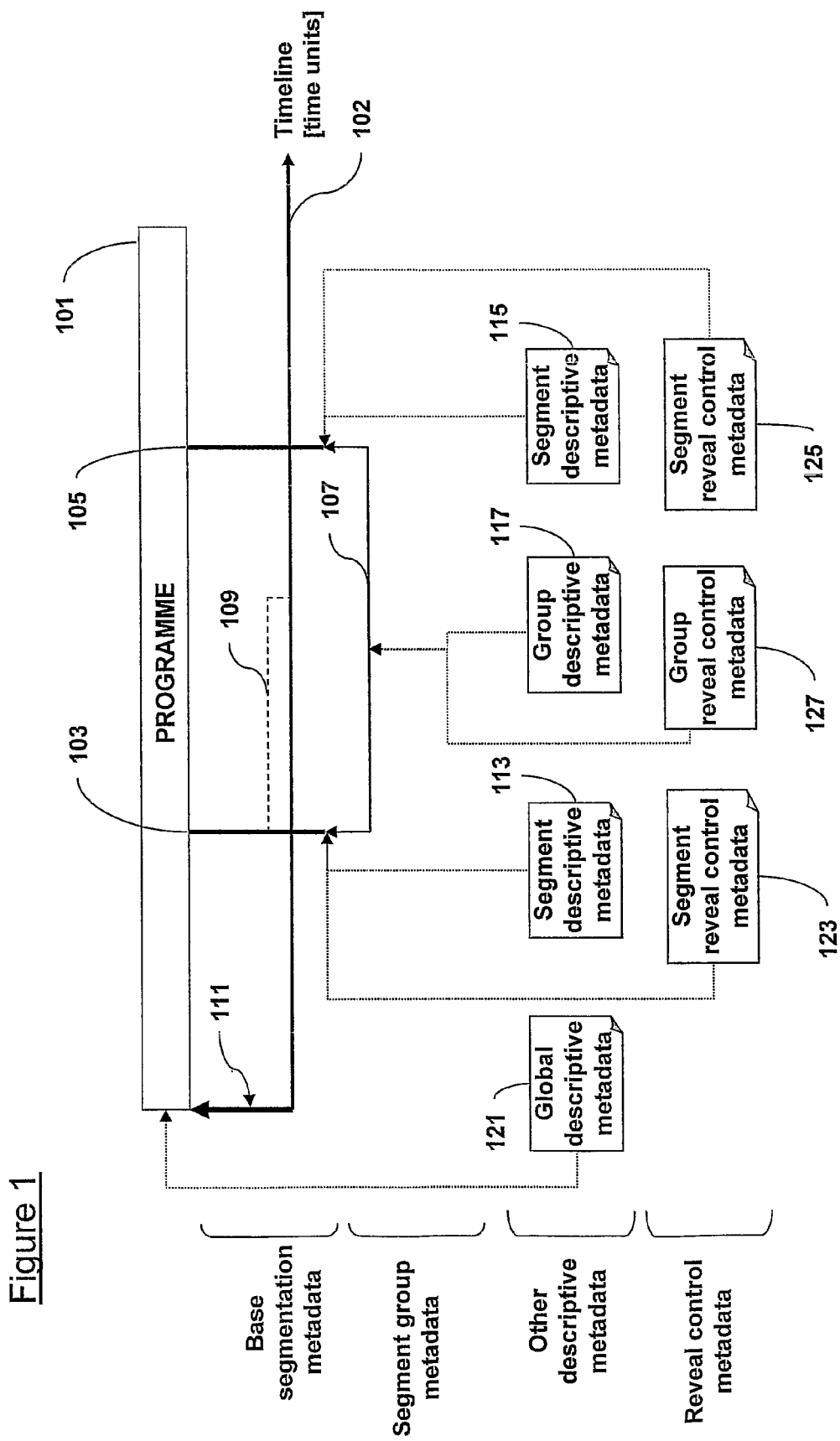
FIG. 1 is a pictorial illustration of a metadata schema according to embodiments of the present invention.

Reference is now made to FIG. 1, which shows in a graphical format a metadata schema according to an embodiment of the present invention. Several standards exist for the definition and carriage of metadata (including segmentation metadata) on a broadcast network or other networks such as an Internet Protocol (IP) network (e.g. the Internet). In the description that follows, reference will be made to European Telecommunications Standard Institute (ETSI) Technical Specification (TS) 102 323 "*Digital Video Broadcasting (DVB); Carriage and signalling of TV-Anytime information in DVB transport streams*" and also to ETSI TS 102 822-3-1 "*Broadcast and On-line Services: Search, select, and rightful use of content on personal storage systems ("TV-Anytime"); Part 3: Metadata; Sub-part 1: Phase 1—Metadata schemas*". However, the metadata scheme referenced above is given as an example only and someone skilled in the art will realise that the use of any suitable metadata scheme would be appropriate.

Base Segmentation Metadata

A programme 101 is an editorially coherent piece of content and is associated with a timeline 102 using Digital Video Broadcasting (DVB) Synchronised Auxiliary Data as described in ETSI TS 102 823, "*Digital Video Broadcasting (DVB); Specification for the carriage of synchronized auxiliary data in DVB transport streams*". Alternatively, timeline 102 could be carried by an MPEG-2 video group of pictures (GOP) header timecode as described in ISO/IEC 13818-2 "*Recommendation ITU-T H.262*". Markers 103/105 relative to the time units on timeline 102 indicate the start time of points of interest (segments) within programme 101. A segment is a continuous fragment of a programme. A particular segment can belong to a single programme only but a programme may contain multiple segments. Marker 103 also has a duration 109 associated with it, whereas marker 105 just indicates a point of entry into programme 101. Preferably, the TVAMediaTime and SegmentLocator types, as described in ETSI TS 102 822-3-1, are used to define the start time metadata and duration metadata of the segments within programme 101. A content reference ID 111, such as a TV-Anytime CRID as described in ETSI TS 102 323 unambiguously identifies programme 101 and relates the metadata associated with markers 103/105 to programme 101. Each segment also has associated with it a unique identifier. Preferably, the SegmentID type described in ETSI TS 102 822-3-1 is used to describe this unique identifier metadata.

Segment Group Metadata

A segment group comprises a collection of segments that are grouped together for a particular purpose or due to a shared property. A segment group can contain segments or other segment groups. Segment group metadata is preferably defined using the SegmentGroupInformation type as described in ETSI TS 102 822-3-1. Referring to FIG. 1, the segments referenced by markers 103/105 form a group 107. For example, a group of segments may consist of all the goals scored in a football match. Groups of segments could also be formed out of segments from multiple content items (e.g. all camera angles of a particular goal or a football match and the highlights package).

Other Descriptive Metadata

Referring to FIG. 1, the segments indicated by markers 103/105 have associated with them segment descriptive metadata 113/115 respectively. This segment descriptive metadata 113/115 is preferably the metadata defined by the BasicSegmentDescription type within the SegmentInformation type as described in ETSI TS 102 822-3-1. Furthermore, segment group 107 has associated with it group descriptive metadata 117, which is preferably the metadata defined by the BasicSegmentDescription type within the SegmentGroupInformation type as described in ETSI TS 102 822-3-1. Also, programme 101 can itself have global descriptive metadata 121 associated with it, preferably defined by the BasicContentDescription and Program-Information types as described in ETSI TS 102 822-3-1.

Reveal Control Metadata

There is also provided a set of metadata that the target device (i.e. the device used by a user to view content item 101) can use to determine when it is appropriate to reveal metadata that the reveal control metadata relates to. When metadata is revealed, it can be seen/used/consumed by the viewer to whom it was revealed.

Referring to FIG. 1, the segments indicated by markers 103/105 have associated with them segment reveal control metadata 123/125 respectively. Furthermore, segment group 107 has associated with it group reveal control metadata 127.

The segment reveal control metadata 123/125 preferably comprises a new type, SegmentRevealControlType, added to the BasicSegmentDescriptionType defined in ETSI TS 102 822-3-1, as shown in XML below.

```
<complexType name="SegmentRevealControlType">
  <sequence>
    <element name="SpoilerFlag" type="boolean" minOccurs="1"
      maxOccurs="1"/>
    <element name="RevealPoint" type="tva:TVAMediaTimeType"
      minOccurs="0" maxOccurs="1"/>
    <element name="ViewingExtentClientModel" type="boolean"
      minOccurs="1" maxOccurs="1"/>
  </sequence>
</complexType>
```

SpoilerFlag is a Boolean flag that when set, indicates that the segment descriptive metadata to which the segment reveal control metadata relates is spoiler metadata and should not be revealed until the related segment has been accessed by the target device (and displayed to a user of the target device). Spoiler metadata is metadata that would spoil/ruin/detract from a viewer's enjoyment of the content being viewed if that spoiler metadata were to be displayed prematurely.

RevealPoint is a location on timeline 102 within the related segment that indicates where in the segment access is deemed to have occurred. When playback reaches this location the related segment descriptive metadata 113/115 can be revealed. If no reveal time is defined, the related segment is preferably deemed to have been accessed when playback reaches the end of the segment.

ViewingExtentClientModel is an additional Boolean flag that when set, indicates to the client that it should adopt a model for revealing metadata based on the viewing extent— that is, the furthest reached point in programme 101. If it is not set then the client adopts a model for revealing metadata based on access to individual segments. These two client models will be described in more detail below.

It should be noted that in alternative embodiments, the presence of RevealPoint and/or ViewingClientExtentModel elements in the SegmentRevealControlType implies that the segment descriptive metadata to which the reveal control metadata relates is spoiler metadata and therefore the SpoilerFlag element may not be necessary. It should also be noted that despite ETSI TS 102 822-3-1 limiting the SegmentLiformationType to a single BasicSegmentDescriptionType, in embodiments of the present invention any particular segment may contain a plurality of BasicSegmentDescriptionType elements, some of which may contain a SegmentRevealControlType whilst some may not.

The group reveal control metadata 127 preferably comprises a new type, SegmentGroupRevealControlType, added to the SegmentGroupInformationType defined in ETSI TS 102 822-3-1, as shown in XML below.

```
<complexType name="SegmentGroupRevealControlType">
  <sequence>
    <element name="SpoilerFlag" type="boolean" minOccurs="1"
      maxOccurs="1"/>
    <element name="RevealSegmentList" type="tva:SegmentsType"/>
    <element name="LogicalAND" type="boolean" minOccurs="1"
      maxOccurs="1"/>
  </sequence>
</complexType>
```

SpoilerFlag is a Boolean flag that when set, indicates that the group descriptive metadata to which the segment group reveal control metadata relates is spoiler metadata and should not be revealed until some condition is met.

RevealSegmentList is a list of segments that have to be accessed before the group descriptive metadata can be revealed. The list of segments contains one or more unique segment IDs.

LogicalAND is a Boolean flag that when set, indicates that the list of segments found in the RevealSegmentList should be processed according to a logical AND operation. In other words, when set, all of the segments in the segment list need to be accessed before the group descriptive metadata can be revealed. If not set, the list of segments should be processed according to a logical OR operation. In other words, when not set, the group descriptive metadata can be revealed if any of the segments in the segment list is accessed. It should be noted that a segment specified in the list of segments need not be a member of the group.

Figure 2:
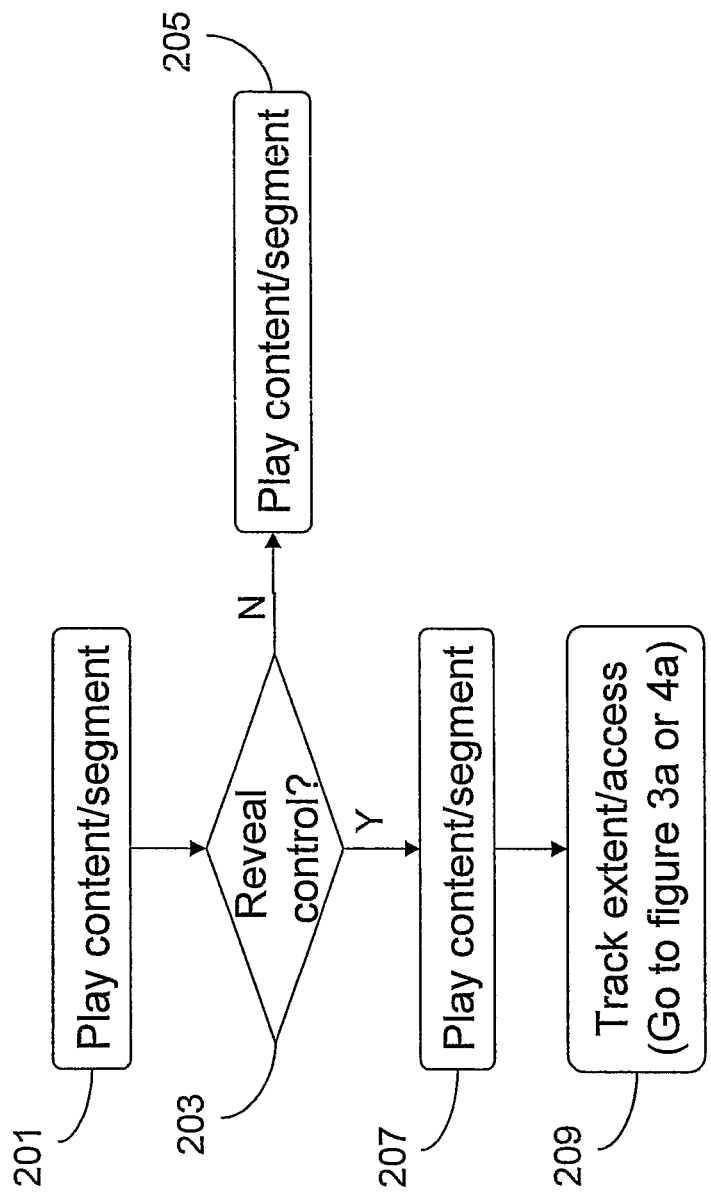
FIG. 2 is a flow chart depicting a method of playing content according to embodiments of the present invention.

With reference to FIG. 2, a viewer selects some content or a segment of content to view (step 201) on a suitable client (e.g. using an electronic programme guide (EPG) accessible via an integrated receiver decoder (IRD) connected to a display device). Once a piece of content or a segment has been selected, the client checks (step 203) whether or not reveal control metadata exists for the selected content/segment.

If no reveal control metadata exists then the client proceeds to playback the selected content or segment (step 205) in a linear fashion. In this case, the viewer also has the option of viewing the content freely in a non-linear fashion either by navigating forwards or backwards through the content or, if segmentation metadata exists for the content, jumping forwards or backwards to a particular segment or opting to display a list of the content's segments (where the descriptive metadata can be freely revealed to the viewer) and selecting a particular segment to view.

If reveal control metadata does exist then the client proceeds to playback the selected content or segment (step 207) but the descriptive metadata to which the reveal control metadata applies should not be revealed to the viewer for segments that have not yet been accessed. In order that the client can respond to reveal control metadata using either of the two models of metadata reveal control mentioned above, the client tracks both the viewing extent through the content or segment and access to the content or segment (step 209). The tracking of the viewing extent will be described below with reference to FIG. 3a. The tracking of access to the content/segment will be described below with reference to FIG. 4.

Figure 3A:
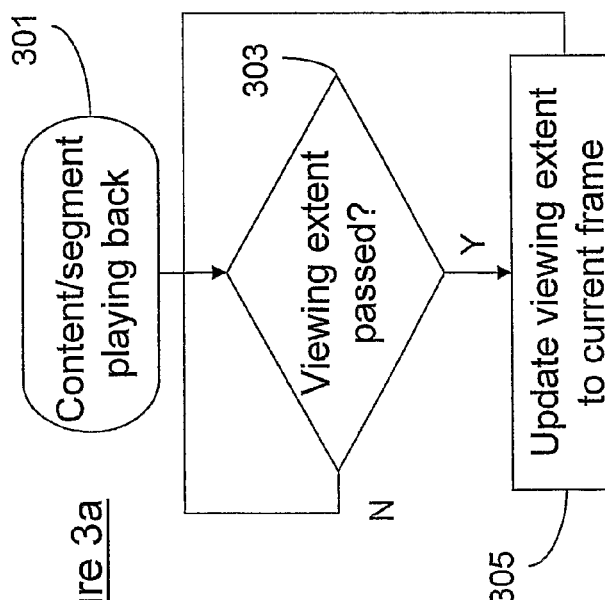
FIG. 3a is a flow chart depicting a method of updating the viewing extent of a piece of content/a segment according to an embodiment of the present invention.

If the ViewingExtentClientModel flag has been set, then the client adopts a model for revealing metadata based on tracking the viewing extent (i.e. the furthest point reached in the content/segment). With reference to FIG. 3a, when the content or segment is playing back (step 301), the client keeps track of the furthest point reached in the content/segment using a variable called 'viewing extent'. The client compares the stored viewing extent with the current frame of the content/segment. If the viewing extent has been passed (i.e. if the current frame is later than the stored viewing extent), the client updates the viewing extent to the current frame (step 305) and then continues to check the viewing extent. If the viewing extent has not been passed (i.e. the current frame is earlier than the stored viewing extent; perhaps because the content or segment is not being viewed for the first time) then the client does not update the viewing extent but rather continues to check the viewing extent. When the content or segment is played back for the first time, it will be realised that the viewing extent is initially set to the first frame of the content or segment.

Figure 4:
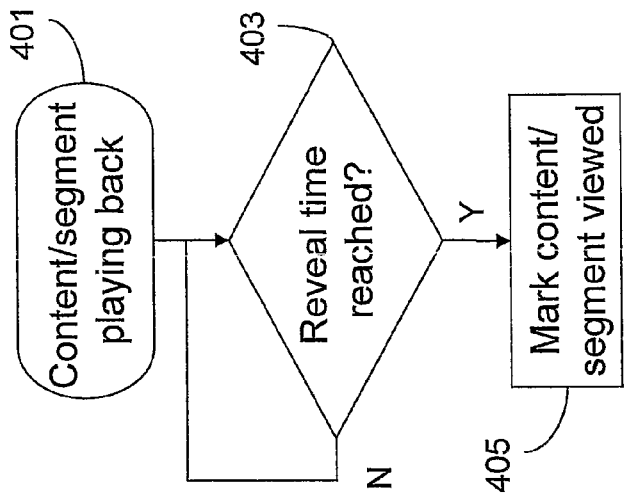
FIG. 4 is a flow chart depicting a method of marking a segment as having been viewed according to an embodiment of the present invention.

If the ViewingExtentClientModel flag has not been set, then the client adopts a model for revealing metadata based on tracking access to individual segments. With reference to FIG. 4, when the content/segment is playing back (step 401), the client checks whether or not a segment reveal time has been reached (step 403). It will be remembered that segment reveal time (the point within the segment where access is deemed to have occurred) can be set using the RevealPoint type in the reveal control metadata. If the reveal time has been reached then the client marks the segment as having been accessed/viewed (step 405). This can be achieved, for example, by the client storing a boolean 'accessed' variable for each segment. If no reveal time has been set in the segment reveal control metadata, then the client checks whether or not the end of the segment has been reached (i.e. the reveal time is assumed to be at the end of the segment). If the reveal time has not been reached then the client continues to check whether or not the reveal time has been reached.

Figure 3B:
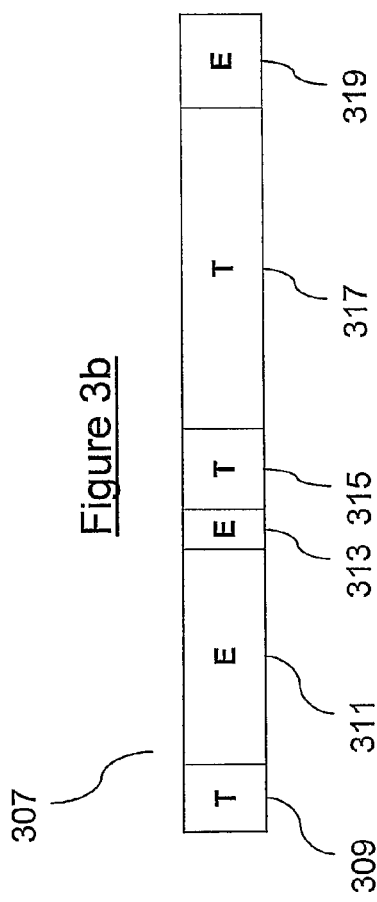
FIG. 3b is an illustration of a programme and segments within a programme according to embodiments of the present invention.

In the extent based model described previously, once a content item has been accessed beyond the reveal time of a segment (whether this be a reveal time stipulated using RevealPoint or the end of the segment), all descriptive metadata relating to segments that (a) lie earlier on the timeline than the viewing extent; and (b) also have their ViewingExtentClientModel flag set can be revealed to a viewer. Referring to FIG. 3b, programme 307 comprises six segments 309/311/313/315/317/319 of varying duration. Segments 309, 315 and 317 do not have their ViewingExtentClientModel flag set (indicated by 'T') whilst segments 311,313 and 319 all do have their ViewingExtentClientModel flag set (indicated by 'E'). Whilst watching programme 307 a viewer first watches all of segment 309 but then jumps to and watches segment 319. The descriptive metadata for segment 309 will be revealed because segment 309 has been accessed. Moreover, the descriptive metadata for segments 311, 313 and 319 will also be revealed because the viewing extent (the furthest point reaches in programme 307) is at the end of segment 319, which is later than the reveal times of both segments 311 and 313 and all of segments 311, 313 and 319 have their ViewingExtentClientModel flags set.

In the 'track access' model described previously, in order to decide whether or not to reveal metadata associated with a segment or segment group, the client checks whether the relevant segment has been accessed (e.g. by checking the Boolean 'accessed' variable for the segment). If the segment has already been accessed, the client reveals any metadata associated with the segment or segment group. If, on the other hand, the segment has not yet been accessed, the client does not reveal any metadata associated with the segment or segment group to the viewer.

Figure 5:
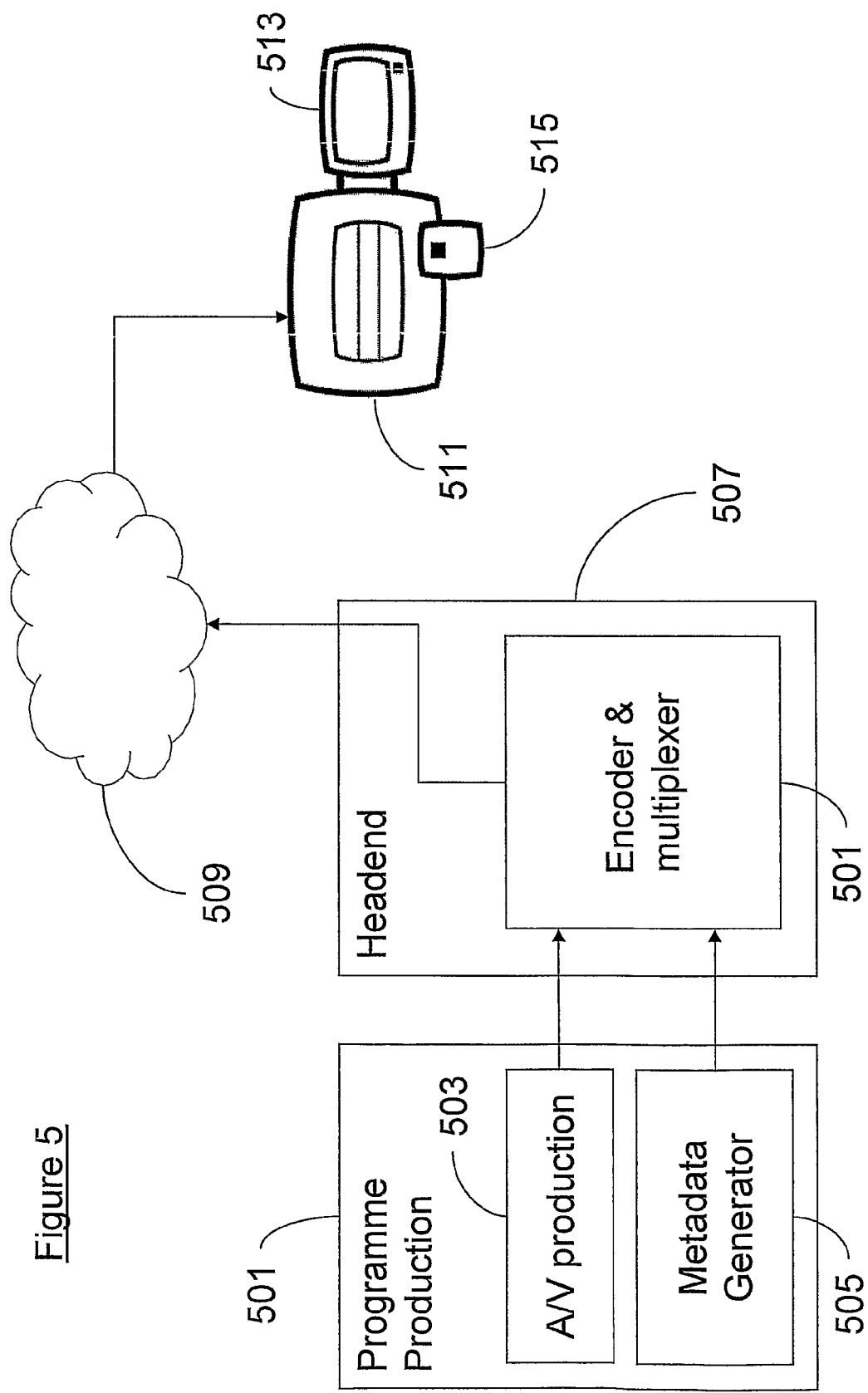
FIG. 5 is a simplified pictorial illustration of an end-to-end broadcast system constructed and operative in accordance with embodiments of the present invention.

An end-to-end broadcast system constructed and operative in accordance with embodiments of the present invention will now be described in relation to FIG. 5.

AV content is produced in programme production facility 501, e.g. a studio or outside broadcast facility. AV production unit 503 generates audio & video content. Metadata generator 505 is used to generate metadata relating to the AV content (including segmentation metadata relating to segments within the AV content). The AV content and metadata are sent to one or more broadcast platform head-ends 507 (for simplicity, only one headend is shown in FIG. 5). In headend 507, the AV content is passed to an encoder and multiplexer where it is compressed (e.g. according to the MPEG-2 standard), packetised and combined with information for decoding, conditional access data and the metadata to form a multiplexed program transmission.

Headend 507 communicates the multiplexed program transmission to a client device 511/513 (which will be described in more detail later) via a one-way or two-way communication network 509 that may include at least one of the following: a satellite based communication network; a cable based communication network; a conventional terrestrial broadcast television network; a telephony based communication network; a telephony based television broadcast network; a mobile-telephony based television broadcast network; an Internet Protocol (IP) television broadcast network; and a computer based communication network. An example of an appropriate telephony or IP based television broadcast network includes, for example, a Synamedia™ system, commercially available from NDS Limited, United Kingdom.

In alternative embodiments, communication network 509 is implemented by a one-way or two-way hybrid communication network, such as a combination cable-telephone network, a combination satellite-telephone network, a combination satellite-computer based communication network, or by any other appropriate network.

Other ways of implementing communication network 509 will be apparent to someone skilled in the art.

Preferably, physical links in network 509 are implemented via optical links, conventional telephone links, radio frequency (RF) wired or wireless links, or any other suitable links.

Headend 507 communicates with a plurality of client devices via communication network 509. Additionally or alternatively, a plurality of headends 507 communicate with a single client device or with a plurality of client devices via communication network 509. For simplicity of depiction and description, and without limiting the generality of the invention, only one client device and a single headend 507 are illustrated in FIG. 5 and referred to below as communicating via the network 509.

Preferably, the client device comprises an integrated receiver and decoder (IRD) 511 connected to a display device 513. In preferred embodiments, the IRD 511 includes a conventional IRD that receives, demultiplexes, decodes and decrypts/descrambles as necessary the multiplexed program transmissions under control of a conditional access device such as a removable security element 515 as is well known in the art. The removable security element 515 preferably includes a smart card as is well known in the art.

In addition, IRD 511 preferably includes a processor, such as, for example, an appropriate video processor as is well known in the art. IRD 511 preferably additionally includes an onscreen display (OSD) unit for displaying messages and other information on display device 513.

In preferred embodiments, IRD 511 includes, or is associated with, a digital video recorder (DVR) that preferably includes a high capacity storage device, such as a high capacity memory. The DVR is preferably operatively associated with IRD 511 and the processor.

IRD 511 preferably includes at least one audio decoder (not shown) and at least one video decoder (not shown). It is appreciated that the DVR may also preferably include at least one audio decoder (not shown) and at least one video decoder (not shown), or alternatively use an audio decoder and a video decoder comprised in the IRD 511, in which case the IRD 511 preferably includes more than one audio decoder and more than one video decoder.

IRD 511 is preferably implemented in any appropriate combination of hardware and software and at least some of the elements within IRD 511 may be comprised in a single integrated circuit (IC).

The DVR preferably records at least some of the program transmissions received at IRD 511 in the storage device and displays recorded program transmissions at a discretion of a user, at times selected by the user, and in accordance with preferences of the user and parameters defined by the user as described, for example, in the published PCT Applications WO 00/01149 (corresponding to U.S. patent application Ser. No. 09/515,118), WO 01/52541 (corresponding to U.S.

patent application Ser. No. 09/914,747 and also published as US 2002/0138831) and WO 02/01866 (corresponding to U.S. patent application Ser. No. 10/297,453 and also published as US 2003/0163832), the disclosures of which are hereby incorporated herein by reference. The DVR also preferably enables various trick modes that may enhance viewing experience of users such as, for example, fast forward or fast backward as described, for example, in the published PCT Applications WO 03/010970 (corresponding to U.S. patent application Ser. No. 10/479,373 and also published as US 2004/0199658) and WO 01/35669 (corresponding to U.S. patent application Ser. No. 09/574,096), the disclosures of which are hereby incorporated herein by reference.

It is appreciated that the recorded program transmissions displayed by the DVR typically comprise program transmissions delayed with respect to a time of broadcast of the program transmissions by headend 507. Therefore, program transmissions that undergo decoding at IRD 511, and if necessary, decryption/descrambling, preferably arrive either from broadcast transmissions broadcast by headend 507 or from the storage device of the DVR. The program transmissions are preferably broadcast by headend 507 as regular scheduled transmissions or in the form of VOD or NVOD transmissions. The program transmissions that are decoded and decrypted/descrambled by IRD 511 typically require processing of a similar type whether provided by headend 507 or by the DVR, or by any other appropriate device in which the program transmissions may be stored, such as a game console or a cellular telephone.

The processor preferably includes an operating system that enables processing of the program transmissions.

IRD 511 preferably accepts, via an input interface, user input from an input device such as a remote control that is operated by the user. The user input is preferably provided to the processor as instructions.

With reference to FIGS. 6a to 6e, a description will now be provided of how a viewer might view a piece of content that contains reveal control metadata in accordance with embodiments of the present invention.

It will be remembered that a viewer called Bob was described as having not attended a particular game of football because he had to attend a luncheon in honour of his mother-in-law's 72 nd birthday! Bob also does not know the result of the match and upon returning home he decides to watch the match in its entirety from the start. The game in question is the match played between the Blues and the Whites on 27 Jul. 2005. This recording is stored in a digital video recorder (DVR) within an IRD in Bob's home. By using an electronic program guide (EPG) provided on the IRD and a remote control to navigate through the EPG, Bob can select the match that he wants to view. Once Bob has decided to view the football match and selected it via the EPG, the IRD checks whether or not the recording has been provided with segmentation metadata. In the present embodiment it has been and therefore Bob is presented with three options. Option 1 is to watch the entire match. Option 2 is to view segment information. By viewing segment information, Bob could have chosen a particular segment to view. Bob might, for example, have only wanted to watch the second half or may have only wanted to see the winning goal. Bob decides to view the whole match and highlights the relevant option by once again navigating the EPG using the remote control. FIG. 6a shows that Bob has highlighted "1. View whole match".

In the present embodiment, the segmentation metadata for the football match is additionally provided with segmentation reveal control metadata that prevents a viewer from viewing the segmentation information associated with a segment (and the segments itself) until the segment has been marked as 'viewed' by the IRD. In the present embodiment, had Bob accidentally selected the option "2. View segment information", his viewing experience would not have been spoiled because no segments had yet been marked as viewed. Preferably, in such an instance, Bob would have been presented with an on-screen message informing him that he had not yet viewed any segments and information about a segment will only appear/be revealed (and access to that segment will only be provided) once that segment has been viewed. This is shown in FIG. 6b.

Figure 6B:
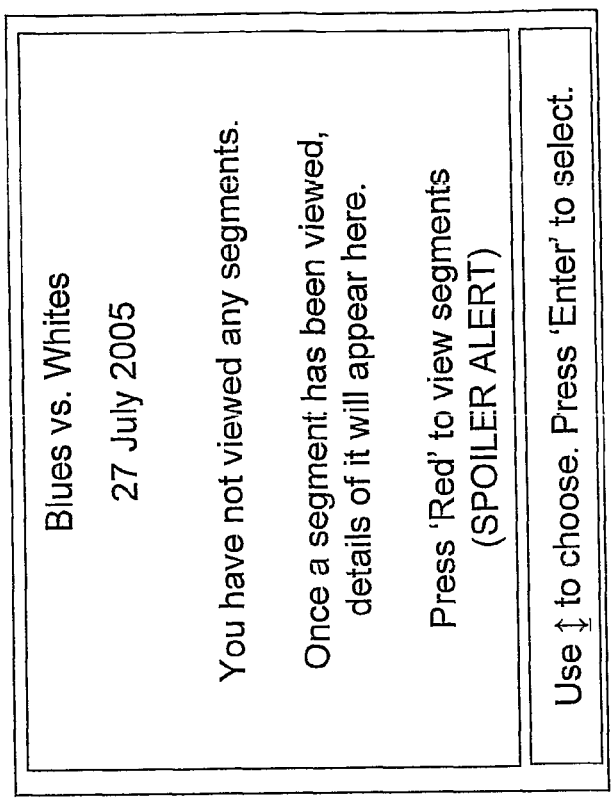
FIGS. 6a to 6g are screen shots that a viewer might see when viewing content containing reveal control metadata according to embodiments of the present invention.
Figure 6A:
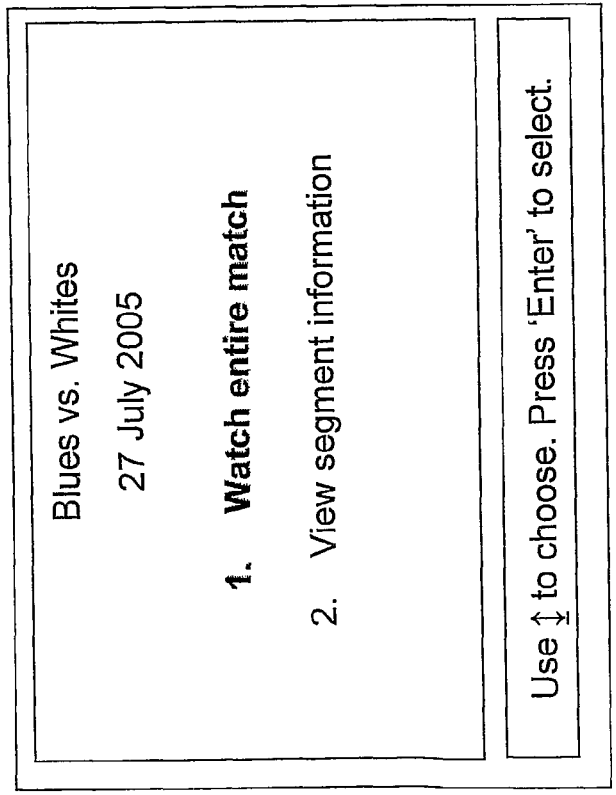

Preferably, an option of bypassing the reveal control and viewing the segment information is provided (for example by pressing the red button on a remote control), as is also shown in FIG. 6b. This would be useful in the other case described above where Andrew had been at the game and all he wanted to do was watch the last minute save. FIG. 6e depicts a screenshot that would be shown to Andrew in this instance. All the segments are listed and he can select "6. Robbins (Blues) Save" in order to view the last minute save.

Having selected to view the whole match, Bob settles down to watch the match and watches the entire first half. At half time, it will be remembered that his son Chris comes in to watch with him. However, Chris has not seen the first half but neither does he want to watch the entire first half from start to finish. Using the remote control and EPG, Bob now selects to view the segment information.

As Bob watches the first half, the IRD marks certain segments as having been 'viewed' in accordance with the segment reveal control metadata and methods as described above. Those segments of the match that Bob has already viewed can thus be presented/revealed to Bob when he selects to view the segment information at the end of the first half. The metadata associated with those segments of the match that Bob has not yet viewed remains hidden from view. With reference to FIG. 6c, the three segments that Bob is able to view are presented on the screen to Bob. These three segments represent the highlights of the first half of the match. Thus Bob can individually select each of these three segments in turn so that Chris can see the highlights of the first half without watching the entire first half. The metadata associated with the remaining segments (representing the remaining points of interest in the match) are not visible (are not revealed) and therefore neither Bob nor Chris's enjoyment of the match is spoiled.

Figure 6D:
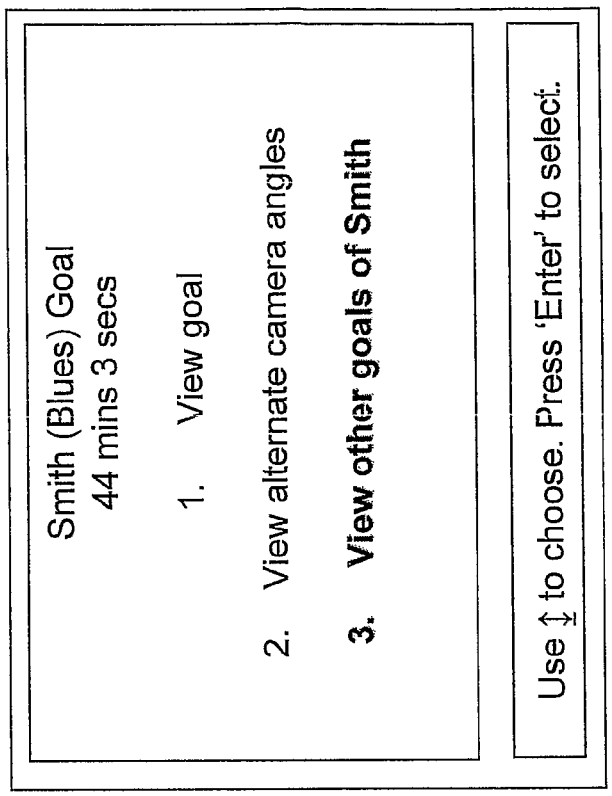
Figure 6C:
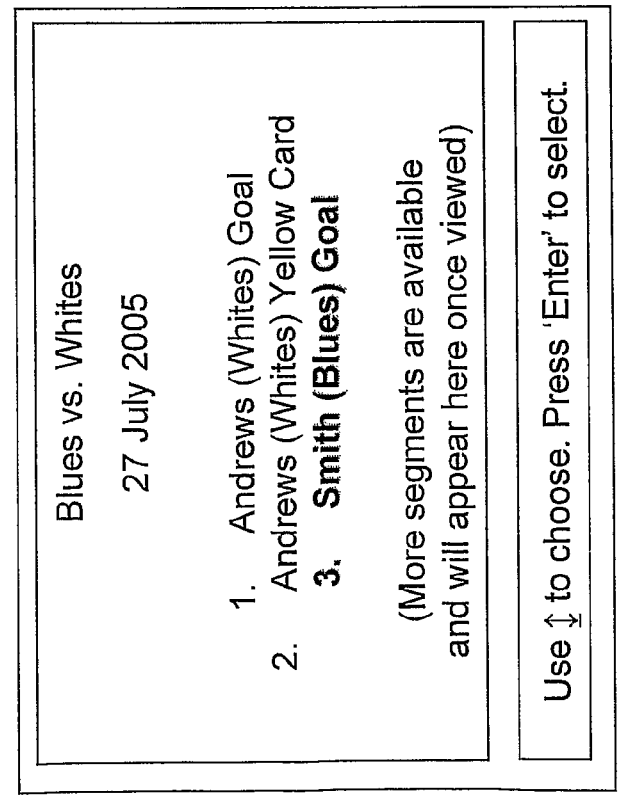

When Bob shows Chris the third segment ("Smith (Blues) Goal"), Bob is presented with three options, as shown in the screenshot in FIG. 6d. Option 1 is to view the goal. The segment of the 'goal' also forms part of a group of segments that includes a number of different camera angles of the same 'goal'. This 'camera angles' group of segments has associated with it group reveal control metadata as described above. The remaining segments in the 'camera angles' group are made available (revealed) to Bob once the IRD has marked the original 'goal' segment as having been viewed. Therefore, since Bob has watched the first half of the match and the third segment (the 'goal' segment) has been marked as viewed, Bob is presented with Option 2, which is to "view alternate camera angles" of the goal. These 'alternate camera angle' segments may already be stored on the DVR. Alternatively, the IRD may be linked to an IP network (e.g. the Internet) from where the segments can be downloaded. Moreover, the segment of the 'goal' may also form part of a group of segments that includes other goals scored by Smith, the goal-scorer and in such a case Bob is presented with Option 3, which is to "view other goals of Smith".

Referring now to FIG. 6e, the second segment of the football match is "Andrews (Whites) Yellow Card". This segment has associated with it segment reveal control metadata as described above. More specifically, in the segment reveal control metadata, the SpoilerFlag has been set but no RevealPoint is specified and the ViewingExtentClientModel flag has not been set. Thus this second segment will only be marked as viewed by the IRD once Bob has viewed the entire segment. This is advantageous because the despite the segment lasting 45 seconds (it includes the build-up to a foul committed by Andrews, an ensuing melee and the yellow card), the yellow card is not shown to Andrews until the end of the segment.

The fifth segment of the football match is "Lewis (Whites) Goal". This segment also has associated with it segment reveal control metadata as described above. More specifically, in the segment reveal control metadata, the SpoilerFlag has been set and a RevealPoint is specified. The ViewingExtentClientModel flag has also been set. The RevealPoint is set just after the goal is scored. This is advantageous because the segment includes the build-up to the goal, the goal itself and the celebrations after the goal. In other words, the critical event takes place in the middle of the segment and it is not necessary for the entire segment to be viewed in order to view the goal. Therefore, once the goal has been scored, the segment can be marked as viewed. Moreover, viewing the fifth segment means that the viewing extent has exceeded the reveal times of both the first and third segments ("Andrews (Whites) Goal" & "Smith (Blues) Goal"). Since both these segments also have their ViewingExtentClientModel flag set, these segments can also now be marked as viewed. This is advantageous because once the fifth segment (a goal) has been seen, the viewer will know the score in the match and therefore marking the earlier goals in the match as viewed (and therefore revealing the descriptive metadata associated with those goals) will not spoil the enjoyment of the match for a viewer.

Figure 6F:
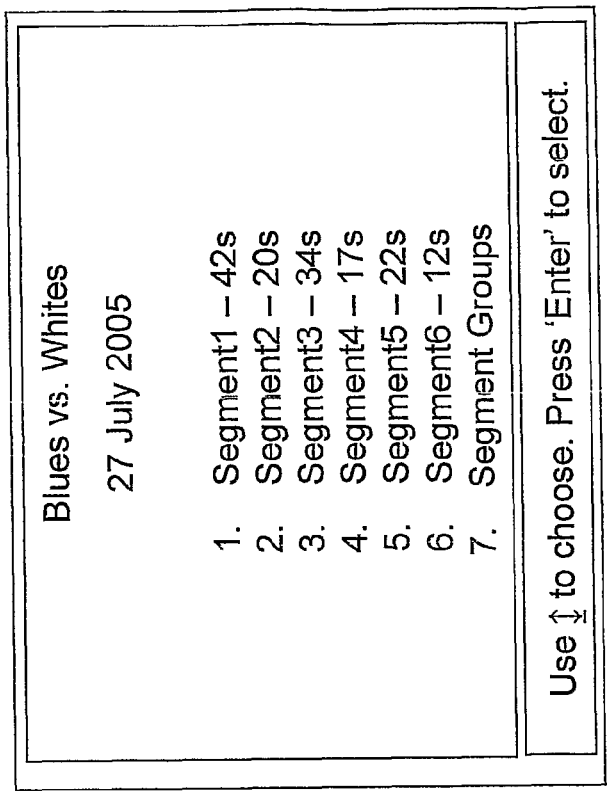
Figure 6E:
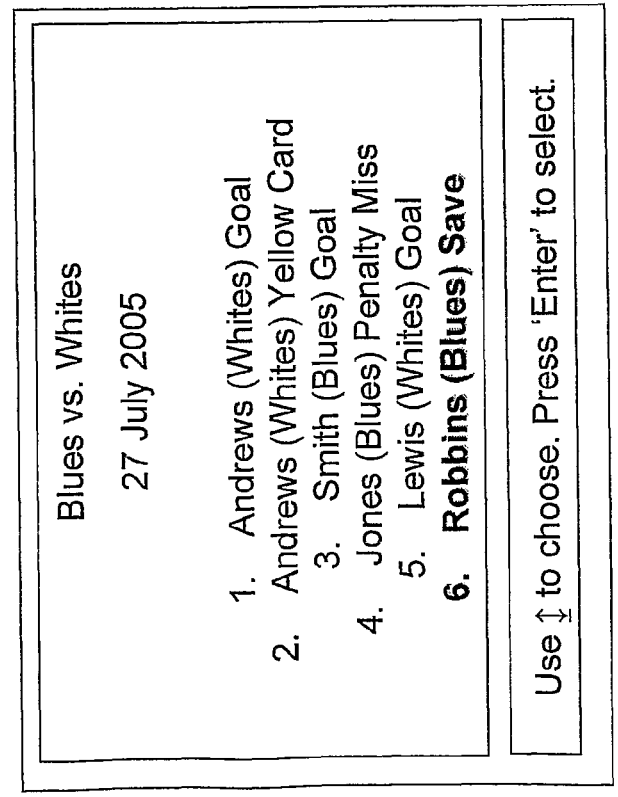

In another embodiment of the present invention, when Bob decides to view the segment information as described above in relation to FIG. 6a, instead of being presented with a screen such as that shown in FIG. 6b, he may be presented with a screen such as that shown in FIG. 6f. In this embodiment, Bob is presented with a list of the segments, where each segment is provided with a generic name (e.g. Segment1, Segment2 etc.) and a duration. No further information about the segments is provided so as not to spoil Bob's viewing enjoyment of the match. Once Bob has viewed a segment (so that the remaining metadata that is subject to reveal control can be revealed) and then gone back to view it again, he might be presented with a screen such as that shown in FIG. 6f, which is similar to the one shown in FIG. 6d.

Figure 6G:
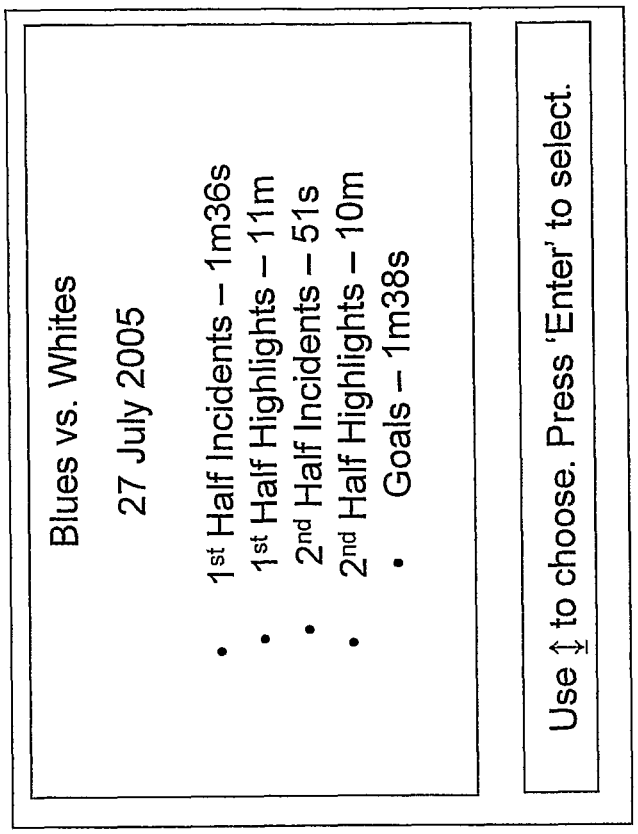

From the screen shown in FIG. 6f, Bob might also have the option to view groups of segments associated with the football match (menu item "7. Segment Groups"). If Bob decides to view segment groups, he might be presented with a screen such as that shown in FIG. 6g which is a list of the segment groups, where each group is provided with a duration and title that is descriptive of the group but not descriptive enough to spoil Bob's enjoyment of the match. For example, Bob might be given the option to watch brief highlights of the first or second half, just the major incidents of the first or second half or just the goals. This is advantageous because Bob can see the duration of the various groups and knows how long it will take the watch the group. He can therefore select a group to watch and view as much of the match that he has time to view but still without having his enjoyment spoiled.

It will be apparent from the foregoing description that many modifications or variations may be made to the above described embodiments without departing from the invention. Such modifications and variations include:

The above described embodiments were all described in relation to broadcast television but the invention is equally applicable in other domains (e.g. DVDs, podcasts, content consumed outside of a television (e.g. on a computer, PDA, mobile telephone).

In the above described embodiments, the metadata revealed was described as being other segmentation metadata. In alternate embodiments, the revealed metadata could be other descriptive metadata. For example, if the content item was a film or drama programme, synopsis data up to the latest viewing extent could be revealed thus allowing a viewer to review/catch-up with what they have already seen. This could be provided, for example, using the Synopsis element of the BasicSegmentDescription type as described in ETSI TS 102 822-3-1. If a synopsis of more than just the particular segment was required then the Synopsis element could be used to describe the synopsis of the segment and all segments temporally up to that segment. Alternatively, a new element could be defined (e.g. ElapsedSynopsis) that could describe the elapsed synopsis data. In yet further embodiments, all viewed segments could be added to an 'elapsed segment' segment group and the elapsed synopsis data could be described in a new ElapsedSynopsis element within the SegmentGroupInformation type.

In the above described embodiments, segments had associated with them segment reveal control metadata and segment groups had associated with them group reveal control metadata. In other embodiments, a programme itself might have associated with it global reveal control metadata In such embodiments, the elapsed programme synopsis data described above could be held as global descriptive metadata, which itself is provided with reveal control. Synopsis metadata items could be associated with various points along the timeline of the programme each having its own reveal time. The more of the programme that is viewed, the more synopsis metadata can be revealed to the viewer.

In other embodiments, the revealed metadata could be a reference to other content (e.g. other AV content, text content, comic strips etc.). For example, when watching a complex drama series, other material describing related sub-plots may become available once a particular point in the main content has been reached (e.g. explaining a certain character's background/past life. Other metadata that could be revealed will be apparent to someone skilled in the art.

In alternative embodiments, there may be multiple sets of metadata attached to the same point on the content timeline but having different reveal characteristics.

In the above described embodiments, the AV content and metadata were described as being multiplexed and delivered together by the headend. In alternative embodiments the content and metadata might be delivered separately. For example, the content is broadcast as described above but the metadata is then retrieved by the IRD via an IP network using the CRID of the content. This is advantageous because metadata associated with programme itself (i.e. global metadata) could be delivered before the programme itself is delivered and segmentation metadata associated with the programme could either be delivered before the programme, during the broadcast of the programme or even after the programme has ended.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove.

The invention claimed is:

1. A method of revealing a metadata item related to a segment of an audio-visual data stream, said method comprising: performing the method in a physical device that is operable to perform the following steps:
   receiving said audiovisual data stream and metadata items at a client, wherein each of the metadata items is related to one or more segments of said audiovisual data stream, and each segment of the one or more segments comprises a continuous fragment of a single programme, wherein at least one segment of the one or more segments is associated with segment reveal control metadata that indicate metadata items related to said at least one segment should not be revealed until the at least one segment has been displayed;
   receiving, at said client, a viewer selection of a segment to view;
   checking whether or not segment reveal control metadata are associated with the selected segment;
   playing back the selected segment if no segment reveal control metadata are associated with the selected segment;
   if segment reveal control metadata are associated with the selected segment:
      hiding from view of a viewer any particular metadata items, that the segment reveal control metadata indicate should not be revealed, until said selected segment has been displayed; and
      revealing said particular metadata items to said viewer only after said selected segment has been displayed.

2. A method according to claim 1, wherein said revealing comprises also revealing one or more additional metadata items related to said audio-visual stream but not related to said selected segment.

3. A method according to claim 1,
   wherein said segment reveal control metadata comprise information related to a temporal location within said at least one segment, and
   wherein said at least one segment is deemed to have been displayed if said at least one segment is displayed beyond said temporal location.

4. A method according to claim 3, wherein
   said at least one segment comprises one of a plurality of a segments of said audio-visual data stream, and
   a metadata item is related to each segment in said plurality of segments, and
   a viewing extent is tracked, said viewing extent comprising a latest temporal location within said audio-visual data stream that has been viewed by said viewer, and
   after one of said plurality of segments has been displayed, any metadata item is revealed if it is associated with reveal control metadata comprising information related to a temporal location earlier than said viewing extent.

5. A method according to claim 3, wherein said at least one segment comprises one of a plurality of a segments of said audio-visual data stream, said plurality of segments forming a group of segments, and a segment group metadata item is related to said group of segments, said segment group metadata item comprising a reveal list, said reveal list identifying one or more of said plurality of segments, said method comprising: revealing said segment group metadata item only after all segments on said reveal list have been viewed.

6. A method according to claim 5, wherein said reveal list further identifies one or more segments not in said group of segments.

7. A method according to claim 3, wherein said at least one segment comprises one of a plurality of a segments of said audio-visual data stream, said plurality of segments forming a group of segments, and a segment group metadata item is related to said group of segments, said segment group metadata item comprising a reveal list, said reveal list identifying one or more of said plurality of segments, said method comprising: revealing said segment group metadata item after any segment on said reveal list has been viewed.

8. A method according to claim 7, wherein said reveal list further identifies one or more segments not in said group of segments.

9. A method according to claim 5, wherein said selected segment is among the group of segments, and the group of segments is associated with segment group reveal control metadata usable to determine when segments on said reveal list can be revealed.

10. A method according to claim 7, wherein said selected segment is among the group of segments, and the group of segments is associated with segment group reveal control metadata usable to determine when segments on said reveal list can be revealed.

11. A method according to claim 1, wherein said audio-visual data stream is delivered to the viewer with said metadata items.

12. A method according to claim 1, wherein said audio-visual data stream is delivered to the viewer separately from said metadata items.

13. A method according to claim 1, wherein a first metadata item and a second metadata item are each related to said at least one segment, said first metadata item and said second metadata item having differing reveal characteristics.

14. A method according to claim 1, wherein said at least one segment comprises one of a plurality of a segments of said audio-visual data stream, and at least one of a plurality of metadata items is related, respectively, to each segment in said plurality of segments, and one or more metadata items remain hidden when a first one of the plurality of metadata items is revealed.

15. A method according to claim 1, wherein a state of the particular metadata items is changed when the selected segment has been displayed, so that the particular metadata items can be revealed freely at all future times after the selected segment has been displayed.

* * * * *

UNITED STATES PATENT AND TRADEMARK OFFICE
CERTIFICATE OF CORRECTION

PATENT NO.        : 8,656,435 B2                                                        Page 1 of 1
APPLICATION NO.   : 12/309889
DATED             : February 18, 2014
INVENTOR(S)       : Ashby et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 893 days.

Signed and Sealed this

Twenty-ninth Day of September, 2015

Michelle K. Lee
*Director of the United States Patent and Trademark Office*